July 21, 1953

C. R. MOON 2,646,493

ARC WELDING MACHINE

Filed March 26, 1951

INVENTOR.
CHARLES R. MOON.
BY
Lockwood, Hahn, Galt & Woodard.
ATTORNEYS.

INVENTOR.
CHARLES R. MOON.
BY
Lockwood, Hahn, Galt & Woodard.
ATTORNEYS.

July 21, 1953 C. R. MOON 2,646,493
ARC WELDING MACHINE
Filed March 26, 1951 6 Sheets-Sheet 3
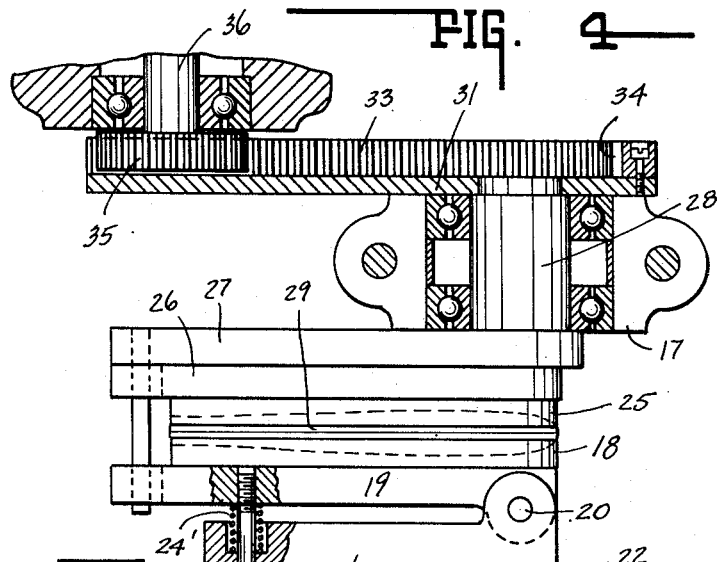
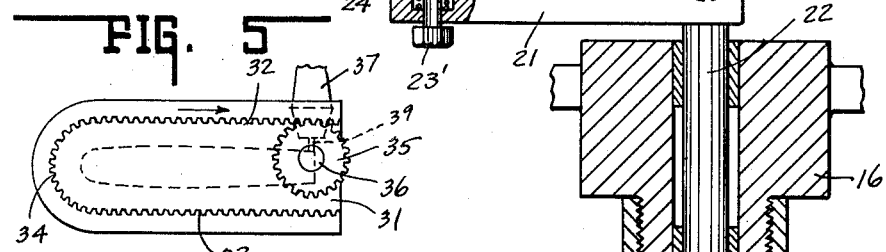
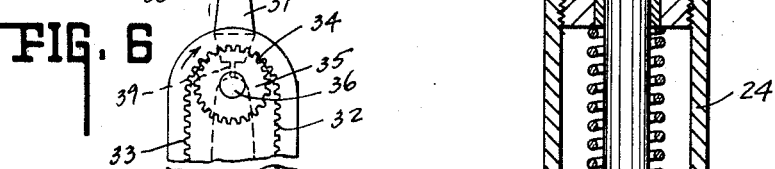
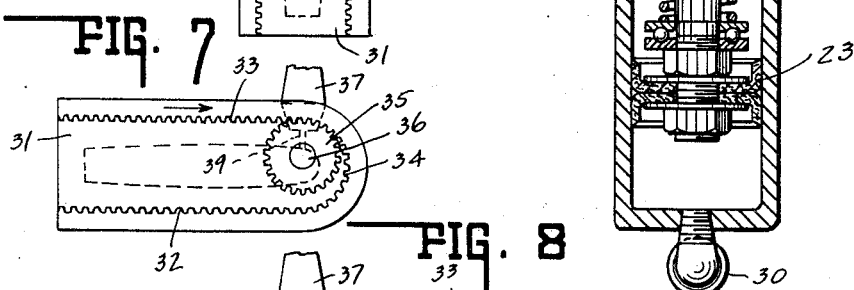
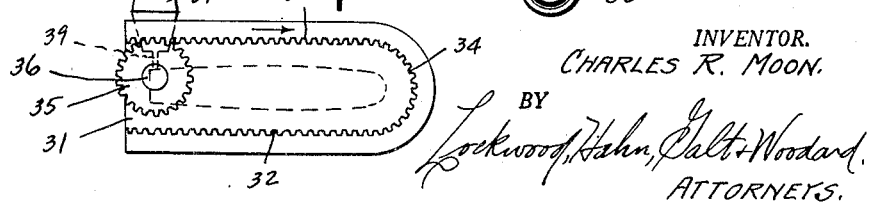
INVENTOR.
CHARLES R. MOON.
BY
Lockwood, Hahn, Galt & Woodard.
ATTORNEYS.

July 21, 1953  C. R. MOON  2,646,493
ARC WELDING MACHINE
Filed March 26, 1951  6 Sheets-Sheet 4
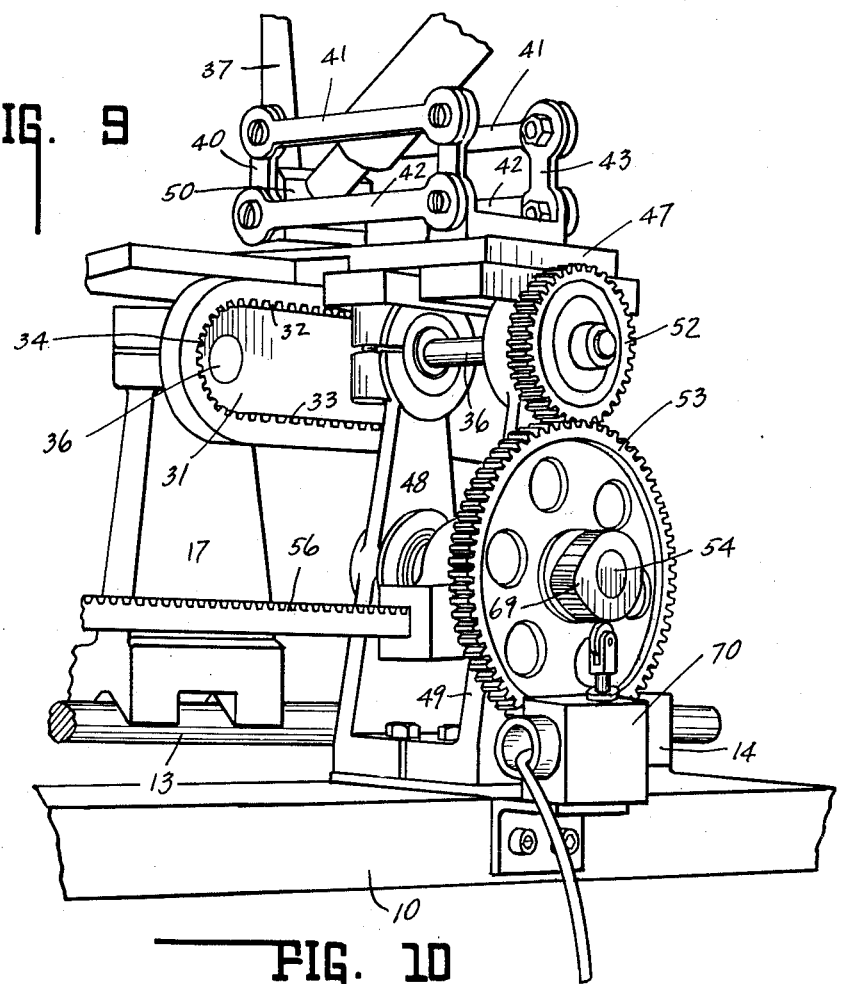
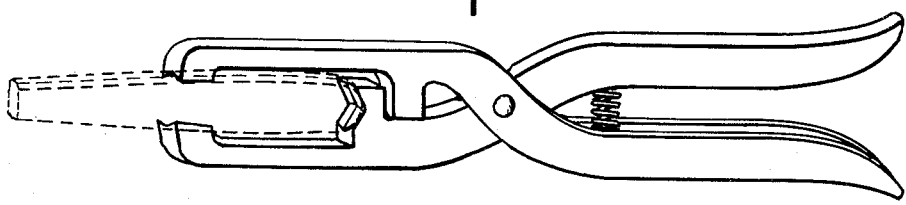
INVENTOR.
CHARLES R. MOON.
BY
Lockwood, Hahn, Galt & Woodard
ATTORNEYS.

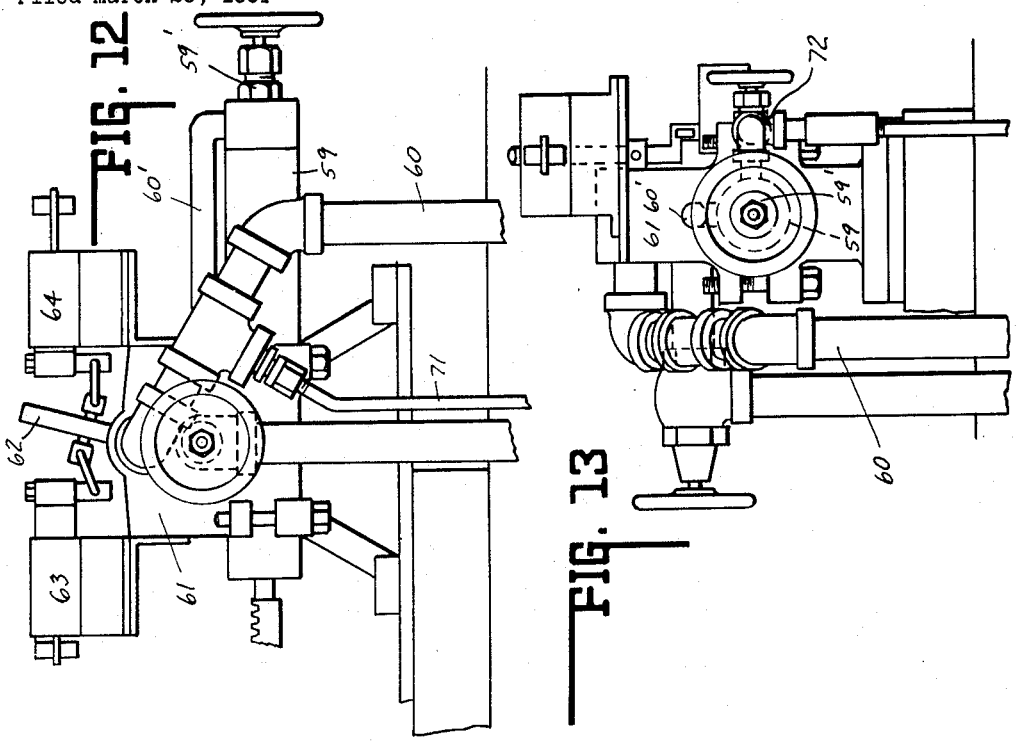
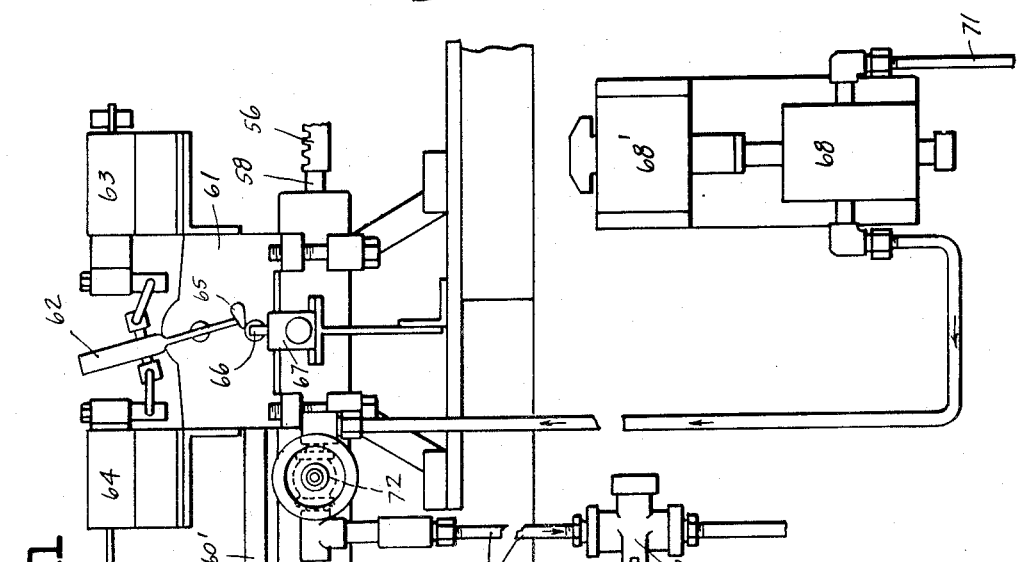

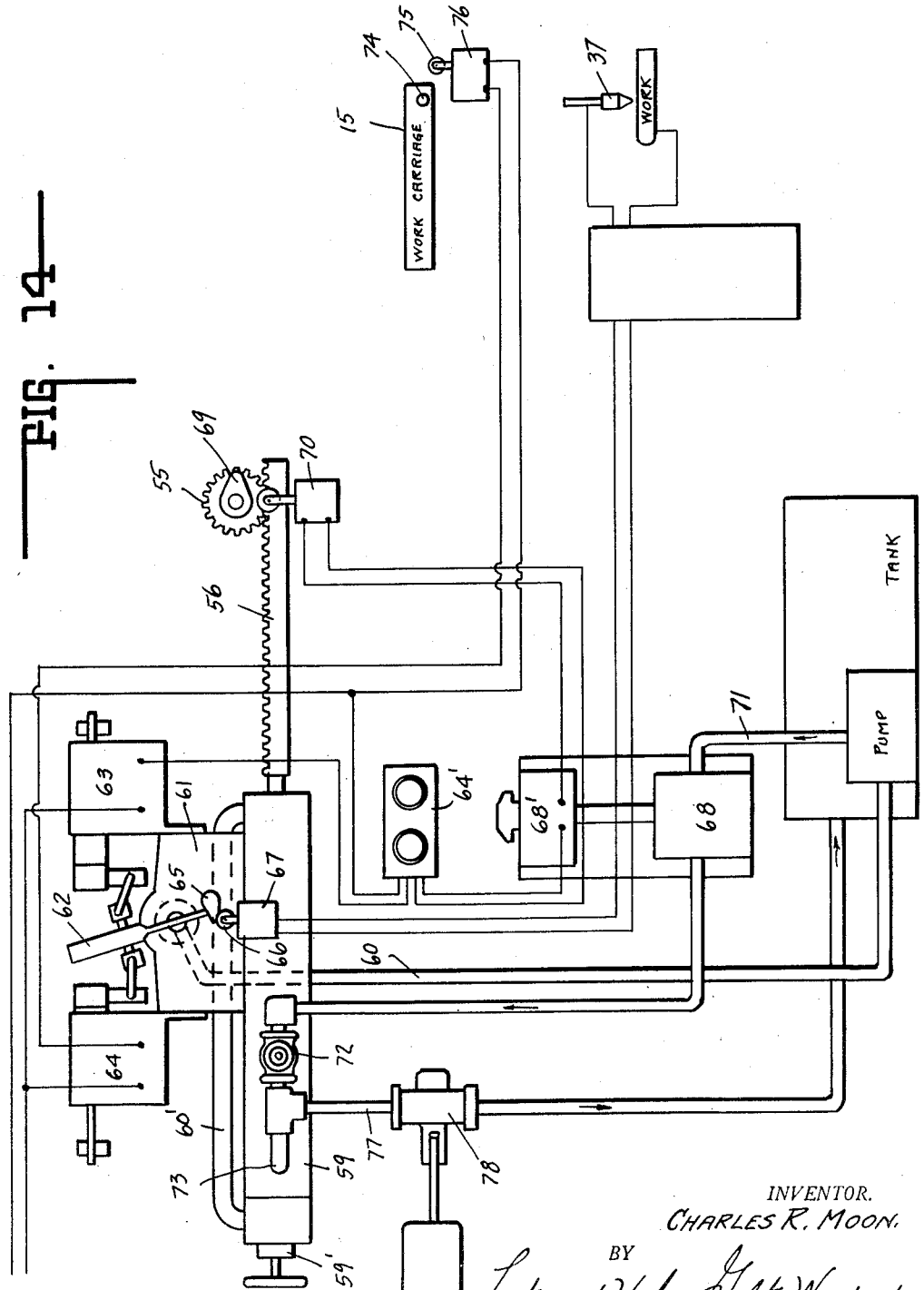

Patented July 21, 1953

2,646,493

UNITED STATES PATENT OFFICE 2,646,493

ARC WELDING MACHINE

Charles R. Moon, Muncie, Ind., assignor to Ontario Manufacturing Company, Muncie, Ind., a corporation Application March 26, 1951, Serial No. 217,578

17 Claims. (Cl. 219—8)

The present invention relates to a welding apparatus, and more particularly to apparatus for welding the edges of hollow ware of irregular shape, the ware being formed in sections and the two sections then being welded together at their edges.

It is one of the objects of the present invention to provide a machine for rapidly effecting a welding between two hollow ware sections in such a manner that the welded joint, after the sections have been polished, can not be discerned.

It is another object of the invention to provide an apparatus which will feed the article to be welded in proximity with the welding electrode of an arc welder and maintaining the spacing between the electrode and the article accurately and consistently irrespective of the variation in the contour of the article to be welded.

It is another object of the invention to provide means for feeding the article to the welder at a continuous pre-determined speed, and controlling the feeding means in such a manner that the linear speed of the joint to be welded relative to the welder welding electrode is constant, irrespective of the configuration of the structure.

Further objects and advantages of the invention will appear more fully hereinafter in the accompanying specification and appended claims.

In the embodiment of the invention illustrated

Fig. 4 is a plan view, parts of the same being shown in section, of the clamping means for holding the article to be welded.

Figs. 5, 6, 7 and 8 are elevational views showing the movement of the clamping jaw and its associated article through the welding course.

Fig. 9 is a perspective view of the mechanism for advancing the article to be welded.

Fig. 10 is an elevation of the clamping grips for assembling the parts to be inserted in the welding clamp.

Fig. 11 is a side elevation, more or less diagrammatic, of the hydraulic means for advancing the article to be welded beneath the arc welder.

Fig. 12 is a similar view looking from the opposite side.

Fig. 13 is an end elevation of the structure illustrated in Figs. 11 and 12.

Fig. 14 is a diagram illustrating the hydraulic system and electrical control circuit therefor.

Figure 1:
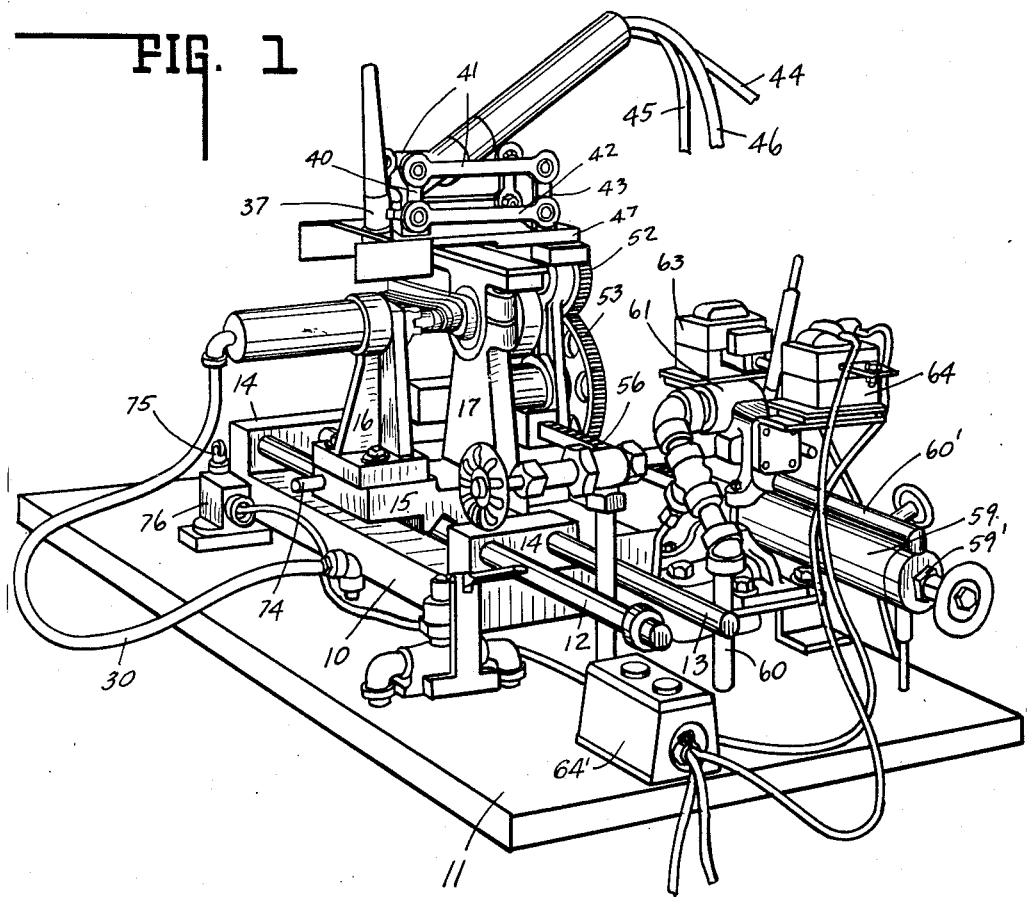
Fig. 1 is a perspective view of the welding machine embodying my invention.
Figure 2:
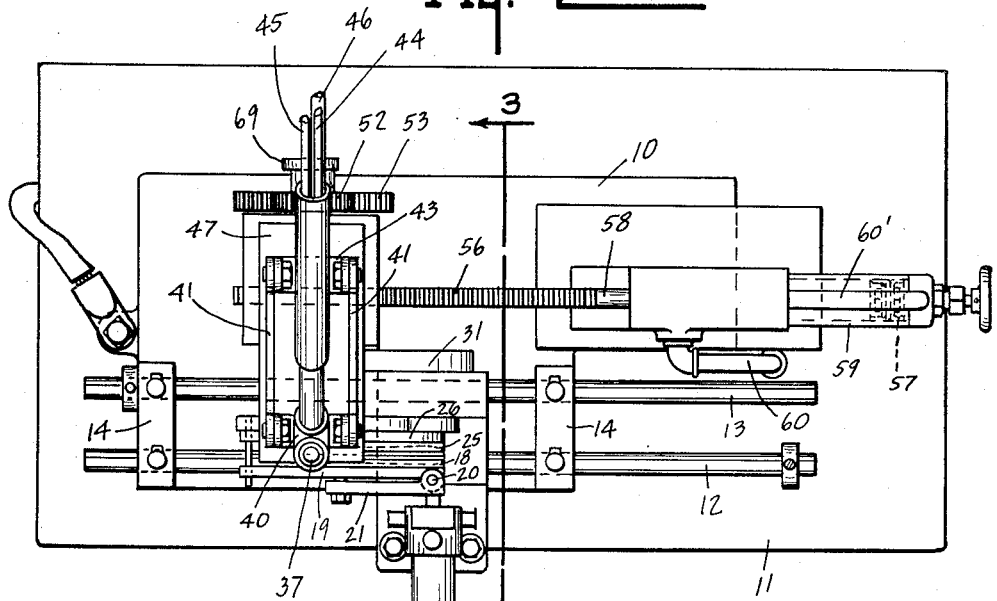
Fig. 2 is a plan view thereof.

In the embodiment of the invention illustrated I provide a suitable base 10, which may be mounted on a supporting platform 11. This base supports a pair of guide rails 12 and 13, extending through upwardly extending arms or blocks 14—14 at the opposite ends of the base 10. Reciprocably slideable upon the guide rails 12 and 13 is a carriage 15 having a pair of vertically extending clamp mounting arms 16 and 17. The arm 16 carries a clamping jaw 18 having a face shaped to conform to the shape of one half of the article to be welded, which clamping jaw is mounted on a pivotally adjustable arm 19 pivoted as at 20 on an arm 21. This arm 21 is mounted on a piston rod 22 connected with the piston 23 operating in a cylinder 24, mounted on the arm 16. The front end of the arm 19 is horizontally adjusted as to clamping tension through the medium of a screw 23' extending through the arm 21 and into the jaw arm 19, and between the jaw arm 19 and the arm 21 is a biasing spring 24'. The opposite clamping jaw 25 has a clamping face similar to the clamping face of the jaw 18, and this jaw is mounted on an arm 26, in turn carried on the face of an arm 27, which arm is rotatably mounted on a shaft 28 carried in a bearing on the upwardly extending support 17. It is to be noted that, as seen in Fig. 4, when the two clamping jaws 18 and 25 are in clamped position, there is provided an open slot 29 between the same which exposes the adjacent edges of the two halves of the article to be welded.

In the present instance the article to be welded is a hollow knife handle. This structure is blanked out in two separate halves, which for the purpose of assembly between the clamping jaws 18 and 25 are grasped between the jaws of the hand grippers shown in Fig. 10, which will hold the two halves in proper assembly relation to permit them to be properly introduced between the jaws 18 and 25.

The jaws are moved into clamped relationship through the medium of fluid pressure operating on the piston 23, which will move, through the piston rod 22, the supporting arm 19 toward the supporting arm 27, which is axially stationary. Fluid pressure is admitted to the cylinder 24, in which the piston 23 operates, from a suitable source of supply through the medium of a flexible supply hose 30. The fluid pressure in the present instance for operating all the parts of the apparatus constitutes oil, which may be supplied from a suitable source by a pump and under sufficient pressure to operate the parts as desired.

The arm 26, heretofore mentioned, is contoured on its surface to conform with the peripheral contour of the article to be welded for the purpose to be more fully hereinafter disclosed.

The shaft 28 carries on its opposite end a plate 31, which on its face is provided with a rack comprising upper and lower runs, respectively, 32 and 33 connected at one end by a loop 34, which rack is adapted to engage and be driven by a gear 35 mounted on the end of a shaft 36.

This rack and gear mechanism is adapted to advance the clamp mechanism, together with the article beneath the arc welder, so that the welding flame will be directed to the joint between the two halves of the knife handle, both on the upper and lower edges and at the rounded base.

The progress of the article and the rack mechanism is more fully illustrated in Figs. 5, 6, 7 and 8. In Fig. 5 the article is just being moved beneath the arc welding point through the medium of the gear 35 operating on the upper run 32 of the rack. As the rack 32 approaches the end of the run, the gear 35, continuing to operate on the loop portion 34 of the rack, will turn the clamp and the article carried thereby to the position illustrated in Fig. 6, the turning movement continuing until the lower run 33 of the rack becomes the upper run in the position illustrated in Fig. 7, and the article and clamp continues to advance in the same direction to the position illustrated in Fig. 8.

During this movement of the article the joint is presented beneath the welding point of an arc welder. This arc welder 37 is of the usual commercial form, and detailed description need not be given except to point out that it is of the argon gas type provided with a welding electrode 39, which is adapted to be positioned immediately above the joint between the two parts of the hollow handle to be welded together. The clamp may be grounded through the carriage in any well known manner. The welder with the electrode 39 is mounted on a head 40, which is supported by pairs of parallel links 41 and 42 pivoted at their opposite ends upon a support 43. By this arrangement the welding electrode 39, when moved vertically, always moves in a right line direction and, therefore, maintains its exact position relative to the joint to be welded. The arc welder is supplied with a suitable welding gas, a circuit for electrical ignition and cooling water through the medium of the hose 44, cable 45 and hose 46. Such a structure is of the usual commercial form and detailed description thereof is unnecessary.

Figure 3:
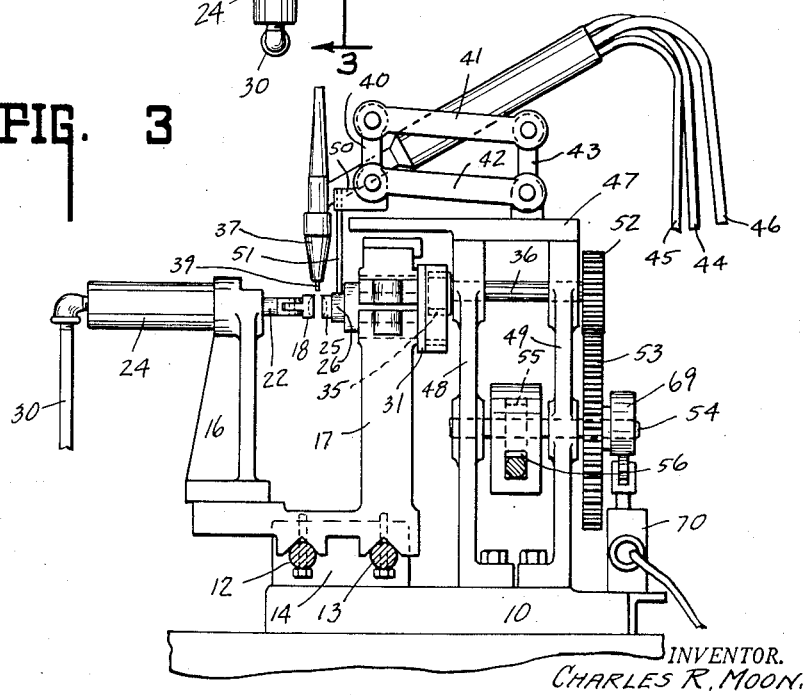
Fig. 3 is a longitudinal sectional view taken on the line 3—3 of Fig. 2.

The supporting arm 43 is mounted on a platform 47, in turn supported on a pair of vertical arms 48 and 49 extending upwardly from the base 10 as is illustrated in Fig. 3 particularly.

The arm 40 carrying arc welder 37 is provided with a laterally extending arm 50, which is provided with a guiding pin 51 adapted to ride on the cam 26 of the clamping jaws so that the welding point 39 will not only follow the contour of the article to be welded, but will be maintained in the same spaced relation with respect to the article throughout the welding operation, and as the article is advanced therebeneath.

The shaft 36 carrying the gear 35 is journalled between the two vertical arms 48 and 49 and at its opposite end carries a driving gear 52. This driving gear 52 in turn meshes with a gear 53 mounted on a shaft 54, likewise journalled in the arms 48 and 49. This shaft 54 is also provided with a pinion 55 in turn adapted to mesh with a reciprocating rack 56, which constitutes a driving mechanism for the parts heretofore described, it being remembered that the rack including the upper and lower runs 32 and 33, and the loop 34 are, as a matter of fact, longitudinally fixed on the upright arm 17 so that the carriage 15, including the arms 16 and 17, will be moved by this rack as the same is advanced and retracted by the gear wheel 35.

The rack 56 is reciprocated through the medium of a suitable piston 57 connected to a piston rod 58, in turn terminating in the rack 56. This piston operates in a hydraulic cylinder 59 supplied with oil under pressure for the purpose of effecting reciprocation of the piston 57.

Oil under pressure is controllably supplied to the cylinder 59 from a suitable pump delivering through a delivery pipe 60 to a control valve 61. This control valve when in one position is adapted to supply oil from the pipe 60 through a pipe 60' to, what may be termed, the rear end of the cylinder 59 behind the piston 57 for the purpose of advancing the rack 56. The flow of oil under pressure may be adjusted by a suitable control valve 59'. The opposite end of this pipe 60' is adapted to communicate with the opposite end of the cylinder 57 for delivering oil under pressure behind the piston 57 after it has reached the limit of its advance stroke. The valve 61 is controlled by an operating handle 62, which in turn is operated through the medium of two control solenoids 63 and 64, respectively, the cores of which are respectively connected by suitable linkage with the handle 62. For initiating a cycle of operation, there is provided a manually operable, normally open switch 64' electrically connected to solenoid 64.

The handle 62 is also adapted through an extension 65 to operate a switch arm 66 of an electric switch 67, which controls the circuit through the welding electrode 39.

As heretofore explained, when the device is operating for the welding of the joint between two halves of a knife handle after the top run 32 of the rack has advanced in the loop 34, the clamping jaws are swung around to present the rounded base of the handle to the arc welder; and as the path of travel during this rotated movement is relatively short, and in order to maintain the same linear speed of the handle relative to the arc welder, it is necessary to speed up the rotation of the driving gear 35 until the complete loop is made, after which the speed is again reduced to the point where the bottom run 33 of the rack is driven at the same speed as the top run 32 had heretofore been driven. In order to accomplish this the linear movement of the rack 56 is speeded up at this point, and to this end I provide means for delivering behind the piston 57 at a predetermined point an additional supply of oil. This supply of oil is controlled through the medium of a supplemental valve 68 operated from a solenoid 68'. The circuit of this solenoid is controlled by a cam 69 on the shaft 54; see more particularly Fig. 9. This cam at a predetermined interval operates a switch 70, which controls the circuit of the solenoid 68'. It is to be noted that this supplemental oil, supplied through the valve 68 from a takeoff 71 connected to the main supply pipe 60, enters the cylinder 59 through an adjusting valve 72 at a point 73 beyond the inlet of the supply pipe 60'. Therefore, after the piston 57 has advanced a predetermined distance in its cylinder, which distance is sufficient to move the upper run 32 of the rack to the point where it strikes the loop 34, this additional supply of oil at the point 73 will speed up the movement of the piston, and with it the driving rack 56 so that the speed of the gear 35 will be materially increased, and, accordingly, the speed of the rack at its loop point will be increased. This cam 69 maintains the circuit of the solenoid 68' closed just sufficiently long for the valve 68 to admit oil under pressure behind the piston 57 during a period that the rack loop 34 is being swung around as illustrated in Fig. 6 to the point as illustrated in Fig. 7. At this point the extra supply of oil is shut off through the opening of the circuit of the solenoid 68' by the switch 70, and the speed of the gear wheel 35 resumes its normal speed to move the lower run 33 of the rack from the position illustrated in Fig. 7 to the end of the run, that is the position illustrated in Fig. 8, at its normal linear speed.

After the rack 56 has reached the limit of its advancing stroke, a trip 74 on the carriage 15 engages a trip arm 75 on a switch 76, which in turn closes the circuit through the control solenoid 64, simultaneously opening the circuit of the solenoid 63; and the handle 62 is moved to a position to operate the control valve to reverse the flow of fluid pressure into the cylinder 59 to drive the piston 57 in the opposite direction moving the parts back to their original position. At the same time that the control valve is operated by solenoid 64, the handle part 65 releases switch 67 opening the circuit through the arc welding point and shutting off the arc weld.

In order to have a more speedy return of the parts to normal position, I have provided a supplemental exhaust 77 controlled by a treadle operated valve 78.

In operation the operator first positions the two halves of the knife handle to be welded in the gripper illustrated in Fig. 10. While held in this position, the two halves are then placed between the jaws 18 and 25, and fluid pressure is admitted to the cylinder 23 through the medium of a foot operated valve 78, which moves the jaws 19 and 25 to firmly grasp the parts in position. With the parts gripped in position and with the rack member in the position illustrated in Fig. 5, a manually controlled switch 64' may be operated momentarily to close the circuit through the solenoid 63. This operates the fluid pressure control valve to admit pressure behind the piston 57 and at the same time operates switch 67 to start the arc welder. As the rack 56, under the influence of the fluid pressure, advances, it drives the gear wheel 53 to move the upper run rack 32 from the position illustrated in Fig. 5 toward the position illustrated in Fig. 6. As the rack reaches the end of its stroke, the cam 69 on the shaft 54 will operate the switch 70 to in turn energize solenoid 68', opening valve 68 and permitting the additional flow of oil or fluid under pressure behind the piston 57, which speeds up the movement of the piston, the rack 56 and with it the gear 53. This speedup period lasts during the swing of the rack loop 34 around, as illustrated in Fig. 6, until the rack reaches the position illustrated in Fig. 7. By this time the switch 70 is opened, opening the circuit of the solenoid 68', and accordingly, additional fluid pressure is shut off behind the piston 57 so that for the rest of the stroke from the position illustrated in Fig. 7 to the position illustrated in Fig. 8, the lower run rack 33 is moved at the same speed as the rack 32 is moved. By the time the lower run rack 33 (now upper run rack 33) reaches the limit of its movement, the switch 76 is momentarily closed closing the circuit through the solenoid 64, operating valve handle 62 to effect a reverse flow of the fluid under pressure behind the piston 57, causing the piston to move in a reverse direction returning the parts to their initial position.

During this entire movement it is to be noted that the guide pin 51 following the contour of the cam 26 maintains the welding point 39 of the arc welder at all times in the same spaced relation to the seam to be welded.

The invention claimed is:

1. In a welding device for welding a linear and curvilinear joint between the edges of two juxtaposed pieces of material having relatively thin walls, the combination with an electric arc welder having a welding electrode, of means for movably supporting said electrode to maintain it at a fixed angle with respect to said joint, means for holding the pieces of material with their edges juxtaposed to present said joint to the welding electrode, means for linearly and curvilinearly feeding said holding means past the welding electrode and means operatively associated with said electrode supporting means and said feeding means for moving said electrode supporting means to maintain constant the spacing between the electrode and the joint irrespective of variations in the contour of the joint.

2. In a welding device for welding the joint between two juxtaposed pieces of material having relatively thin walls and of irregular contour, the combination with an electric arc welder having a welding electrode, of means for holding the two pieces of material with their edges in juxtaposed relation to present a joint to be welded, means for feeding said holding means past the welding electrode and means for varying the speed of the holding means and maintaining constant the linear speed of the joint past the welding electrode, irrespective of the contour of the article.

3. In a welding device for welding a linear and curvilinear joint between the edges of two juxtaposed pieces of material having relatively thin walls, the combination with an electric arc welder having a welding electrode of means for holding the two pieces of material with their edges in juxtaposed relation to present said joint to be welded, means for linearly and curvilinearly feeding said holding means past the electrode, a vertically adjustable support for moving said electrode along a certain axis, and means for vertically adjusting said support in conformity to the contour of said joint.

4. In a welding device for welding the joint between two juxtaposed pieces of material having relatively thin walls and having oppositely disposed jaws to present oppositely disposed seams to be welded, the combination with an electric arc welder having a welding electrode, of means for holding the two pieces of material with their edges in juxtaposed relation to present a joint to be welded and means for advancing one face of said pieces beneath the welder at a certain speed to present one joint to the electrode, reversing the pieces at a greater speed to present a joint on the opposite side and advancing the pieces at said certain speed with the joint on the opposite side presented to the arc electrode.

5. In a welding device for welding the joint between two juxtaposed pieces of material having relatively straight edges connected at one end by a curved portion, the combination with an electric arc welder having a welding electrode, of means for advancing the top edge of the pieces beneath the electrode at a certain speed, rotating the pieces at a greater speed to present the curved edge to the electrode and advancing the opposite edge beneath the electrode at said certain speed.

6. In a welding device for welding the joint between two juxtaposed pieces of material having relatively thin walls and linear edge portions connected by a curved portion, the combination with an electric arc welder having a welding electrode, of means for clamping the pieces of material with their edges adjacent to present upper and lower joints and a curved end joint, means operatively associated with said clamping means for advancing the upper edge joint beneath the welding electrode, for rotating the pieces to present the curved edge to the welding electrode and for advancing the opposite edge beneath said electrode, and control means operatively associated with said advancing means for increasing the speed of rotation of the article relative to the advancing speed, to maintain the linear speed of the joint constant throughout its passage beneath the electrode.

7. In a welding device for welding the joint between two juxtaposed pieces of material having relatively thin walls and of irregular contour, the combination with an electric arc welder having a welding electrode, of a clamp for securing the two pieces of the article in edge to edge relationship, said clamped pieces having joints at their top and bottom portion thereof and at a curved end to be welded, a rack for advancing the clamp beneath the welding electrode having a pair of parallel spaced apart facing racks connected at one end by a curved run and a driving gear adapted to mesh with said rack.

8. In a welding device for welding the joint between two juxtaposed pieces of material having relatively thin walls and of irregular contour, the combination with an electric arc welder having a welding electrode, of a clamp for securing the two pieces of the article in edge to edge relationship to present a joint to be welded, said pieces having a joint at the upper and bottom faces thereof and on a curved end face, a rack for advancing the clamp beneath the welding electrode having a pair of parallel spaced apart facing racks connected at one end by a curved run, a driving gear adapted to mesh with said rack for moving said clamp beneath the welding electrode and means for operating said gear at an increased speed during the engagement thereof with the curved portion of the rack.

9. In a welding device for welding a linear and curvilinear joint between two juxtaposed pieces of material having relatively thin walls, the combination with an electric arc welder having a welding electrode and a vertically movable support for said electrode, of a pair of clamping jaws for clamping the pieces to be welded therebetween to present said joint to be welded, associated with said welding electrode, one of said jaws having a cam conforming to the contour of said joint, and means operated by said cam for moving the electrode vertically in a constant linear right line direction relative to the joint to maintain constant the spacing between the electrode and the joint.

10. In a welding device for welding the joint between two juxtaposed pieces of material having relatively thin walls and of an irregular contour, and having upper and lower surfaces connected by a curved face, the combination with an electric arc welder having a welding electrode, of a clamp for securing the two pieces of the article in edge to edge relationship, a rack for advancing the clamp beneath the welding electrode, including a pair of spaced apart rack runs connected by a curved run, a driving gear adapted to mesh with said rack, means for driving said driving gear at increased speed while in engagement with the curved run, a cam member carried by said clamp and conforming to the irregular contour of the article to be welded, and means operated by said cam member for moving the welding electrode relatively to the joint in accordance with the irregularities of the joint to maintain the spacing between the electrode and the joint constant throughout the welding operation.

11. In a welding device for welding a linear and curvilinear joint between the edges of two juxtaposed pieces of material having relatively thin walls, the combination with an arc welder having a welding electrode of a clamp for securing the pieces to be welded in edge to edge relationship to present said joint to be welded, fluid pressure operating means for advancing said clamp linearly at a certain speed beneath said welding electrode, and means for increasing at the curvilinear portion of said joint the fluid pressure for operating said advancing means at a greater speed.

12. In a welding device for welding the edge joint between two juxtaposed pieces of material having relatively thin walls and edges of irregular shape, the combination with an arc welder having a welding electrode, of a clamp for securing the pieces of material in position with their edges juxtaposed to present said joint for welding, a rack operatively associated with said clamp for advancing said clamp beneath said welding electrode, a gear for driving said rack, driving means for said gear, including a fluid pressure cylinder and a fluid pressure operated piston in said cylinder operable at a certain speed during welding of certain portions of said edges, and means for increasing the fluid pressure in said cylinder at a predetermined interval for increasing the speed of movement of said piston during welding of other portions of said edges.

13. In a welding device for welding the edge joint between two juxtaposed pieces of material having relatively thin walls and edges of irregular contour, the combination with an electric arc welder having a welding electrode, of means for holding the pieces of material with their edges juxtaposed to present said joint for welding to the welding electrode, means for advancing said holding means relatively to the electrode, including a fluid pressure cylinder having an operating piston therein, operatively connected with said holding means, means for controlling the admission of fluid under pressure, movable to one position for admitting fluid under pressure to one end of said cylinder for advancing said holding means, and means operated when the holding means reaches the end of its advancing movement for effecting the movement of said controlling means to another position for admitting fluid under pressure to the opposite end of said cylinder for retracting said holding means.

14. In a welding device for welding the edge joint between two juxtaposed pieces of material having relatively thin walls and edges of irregular contour, the combination with an electric arc welder having a welding electrode, of means for holding the pieces of material with their edges juxtaposed to present said joint to the welding electrode, means for advancing said holding means relatively to the electrode, including a fluid pressure cylinder having an operating piston therein operatively connected with said holding means, means for controlling the admission of fluid under pressure movable to one position for admitting fluid under pressure to one end of said cylinder, for advancing said holding means, and means for effecting the energization of said welding electrode when said holding means is advanced.

15. In a welding device for welding the edge joint between two juxtaposed pieces of material having relatively thin walls and edges of linear and curvilinear contour, the combination with an electric arc welder having a welding electrode, of means for holding the pieces of material with their edges interposed to present said joint to the welding electrode, means for advancing said holding means relatively to the electrode, including a fluid pressure cylinder having an operating piston therein operatively connected to said holding means, means for controlling the admission of fluid under pressure movable to one portion for admitting fluid under pressure to one end of said cylinder for linearly and curvilinearly advancing said holding means, means for effecting energization of the electrode when said holding means is advanced, means operated when said holding means reaches the end of its advancing movement for effecting the movement of said controlling means to another portion for admitting fluid pressure to the opposite end of said cylinder for retracting said holding means and for simultaneously deenergizing said electrode.

16. In a welding device for welding the edge joint between two juxtaposed pieces of material having relatively thin walls and edges of linear and curvilinear contour, the combination with an electric arc welder having a welding electrode, of means for holding the pieces of material with their edges juxtaposed to present said joint to the welding electrode, means for linearly and curvilinearly advancing said holding means relatively to said electrode, including a fluid pressure cylinder having an operating piston operatively connected to said holding means, means for controlling the admission of fluid under pressure movable to one portion for admitting fluid under pressure to one end of said cylinder for linearly advancing said holding means, and means operable after a predetermined period for admitting, for a controlled period, additional fluid under pressure to said cylinder during curvilinear advancing movement and increasing the speed of advancing said holding means.

17. In a welding device for welding the joint between two juxtaposed pieces of material having relatively thin walls and of linear and curvilinear contour, the combination with an electric arc welder having a welding electrode and a vertically adjustable support for said electrode, means for holding the two pieces of material with their edges in juxtaposed relation to present a joint to be welded, means for linearly and curvilinearly feeding said holding means past the electrode and means for vertically adjusting said electrode support in a constant linear right line direction in conformity to the contour of the joint to be welded.

CHARLES R. MOON.

References Cited in the file of this patent

UNITED STATES PATENTS

| Number | Name | Date |
| --- | --- | --- |
| 1,957,489 | Comstock | May 8, 1934 |
| 2,303,720 | Berkeley | Dec. 1, 1942 |
| 2,509,606 | McPhee | May 30, 1950 |